United States Patent [19]

Hatakeyama et al.

[11] Patent Number: 4,658,355
[45] Date of Patent: Apr. 14, 1987

[54] PIPELINE ARITHMETIC APPARATUS

[75] Inventors: Yasuhiko Hatakeyama; Hiroshi Murayama, both of Hadano, Japan

[73] Assignee: Hitachi, Ltd., Tokyo, Japan

[21] Appl. No.: 449,659

[22] Filed: Dec. 14, 1982

[30] Foreign Application Priority Data

Dec. 18, 1981 [JP] Japan .................................. 56-203702

[51] Int. Cl.[4] .......................................... G06F 15/347
[52] U.S. Cl. .................................... 364/200; 364/900; 364/736
[58] Field of Search ........ 364/200, 900, 200 MS File, 364/900 MS File, 736

[56] References Cited

U.S. PATENT DOCUMENTS

| | | | |
|---|---|---|---|
| 4,025,771 | 5/1977 | Lynch, Jr. et al. ................... | 235/156 |
| 4,128,880 | 12/1978 | Cray ..................................... | 364/200 |
| 4,149,242 | 4/1979 | Pirz ..................................... | 364/200 |
| 4,187,539 | 2/1980 | Eaton ................................... | 364/200 |
| 4,228,497 | 10/1980 | Gupta et al. ......................... | 364/200 |
| 4,309,691 | 1/1982 | Castleman ................. | 340/146.3 MA |
| 4,463,441 | 7/1984 | Kassabou et al. ................... | 364/900 |

Primary Examiner—Gareth D. Shaw
Assistant Examiner—Christina M. Eakman
Attorney, Agent, or Firm—Antonelli, Terry & Wands

[57] ABSTRACT

In a pipeline arithmetic apparatus, an arithmetic operation is divided into a plurality of stages and processed in an overlapping manner in each of the stages. Arithmetic circuits are provided each in association with each stage. Registers hold control information indicating the contents of arithmetic operations to the individual arithmetic circuits or to a predetermined number of the arithmetic circuits, respectively. The control information held by each of the registers is supplied to the associated arithmetic circuit or circuits straight-forwardly or after having been decoded to command the arithmetic operation to be executed by each of the arithmetic circuits. The control information held by each of the registers as well as the output from each of the arithmetic circuits is transferred to the registers and the arithmetic circuits of the succeeding stages, respectively.

7 Claims, 7 Drawing Figures

PIPELINE ARITHMETIC APPARATUS

BACKGROUND OF THE INVENTION

1. Field of the Invention

The present invention relates generally to a pipeline arithmetic apparatus. More particularly, the invention concerns a pipeline arithmetic apparatus which is capable of processing plural types of arithmetic operations in overlap.

2. Description of the Prior Art

In a pipeline arithmetic apparatus, the arithmetic operation is divided into a plurality of stages to be processed in an overlapping manner. To this end, arithmetic circuits are provided in correspondence to the individual states, respectively, to perform arithmetic operations in accordance with respective instructions, wherein the output of a given stage is supplied to the arithmetic circuit belonging to the suceeding stage. Although the hitherto known pipeline arithmetic apparatus is capable of processing plural sets of input data in overlapping fashion in a continuous manner for a single type of arithmetic operation, it can not execute continuously different types of arithmetic operations. In other words, until the processing of an arithmetic operation of one given type has been completed, the succeeding arithmetic operation of another type can not be initiated in an overlapping manner with the said one type arithmetic operation. For example, the hitherto known pipeline arithmetic apparatus can certainly execute floating-point addition continuously in an overlapping manner for plural sets of input data. However, it can not execute continuously the different types of arithmetic operations such as floating-point addition and fixed-point addition or floating-point subtraction in an overlapping manner with each other.

FIG. 1 of the accompanying drawings shows in a block diagram a typical known pipeline arithmetic apparatus which consists of three stages and includes three arithmetic circuits 2, 3 and 4. The data processing chain or data system of this pipeline arithmetic apparatus comprises an operand input register 1, intermediate stage latches 5 and 6, a register 7 for storing the results of the arithmetic operation and the arithmetic circuits 2, 3 and 4. Operands sent out from a storage 8 are supplied to the data system mentioned above through a data input bus 9, while the results of the arithmetic operation are stored in the storage 8 through a write-in bus 10. A main storage of associated computer system may be used as the storage 8 or alternatively the latter may be constituted by a group of data registers.

On the other hand, an operation code which indicates the type or content of the arithmetic operation for alternatively information which corresponds to the operation code (this information is referred to as the control information) is supplied from an instruction read-out circuit 18 to an instruction register 20 through an instruction activating bus 19 to be set therein in response to a set signal 22. The control information placed in the instruction register 20 is decoded by a decoder 21 which in turn responds to the control information to produce control signals for the data system or data processing chain such as latch set signals 11, 12, 13 and 14 and arithmetic operation control signals 15, 16 and 17.

FIG. 2 of the accompanying drawings shows time charts for illustrating two types of vector operations A and B executed continuously in the pipeline arithmetic apparatus shown in FIG. 1. The vector operations A and B concern the arithmetic operations of different types or contents. It is assumed that the arithmetic operations A and B are both executed for three sets of input data. In FIG. 2, numerals in circle ①, ② and ③ represent element numbers of the operand vectors, respectively. As will be seen from FIG. 2, the operation A is executed continuously for the elements ①, ② and ③ in overlap with one another. However, the contents of the instruction register 20 can not be altered until the result of aritmetic operation for the last inputted element ③ of the arithmetic operation A has been outputted, thus involving three useless cycles (pipeline pitches) before the first element of the succeeding arithmetic operation B is allowed to be inputted.

SUMMARY OF THE INVENTION

It is an object of the present invention to provide a pipeline arithmetic apparatus which is capable of processing plural different types of arithmetic operations in an overlapping manner.

According to an aspect of the invention, there is provided a pipeline arithmetic apparatus in which arithmetic circuits are provided in correspondence to stages, respectively, and in which a register for holding the control information indicative of the content or type of arithmetic operation is provided in correspondence to each of the arithmetic circuits or to a predetermined number of the arithmetic circuits. The control information is supplied to the associated arithmetic circuit straight forwardly or after having been decoded, to command the type or content of the arithmetic operation to be executed. The control information held in each register as well as the output of each arithmetic circuit is sequentially supported to the registers and the arithmetic circuits of the succeeding stages.

DESCRIPTION OF THE PREFERRED EMBODIMENTS

Figure 1:
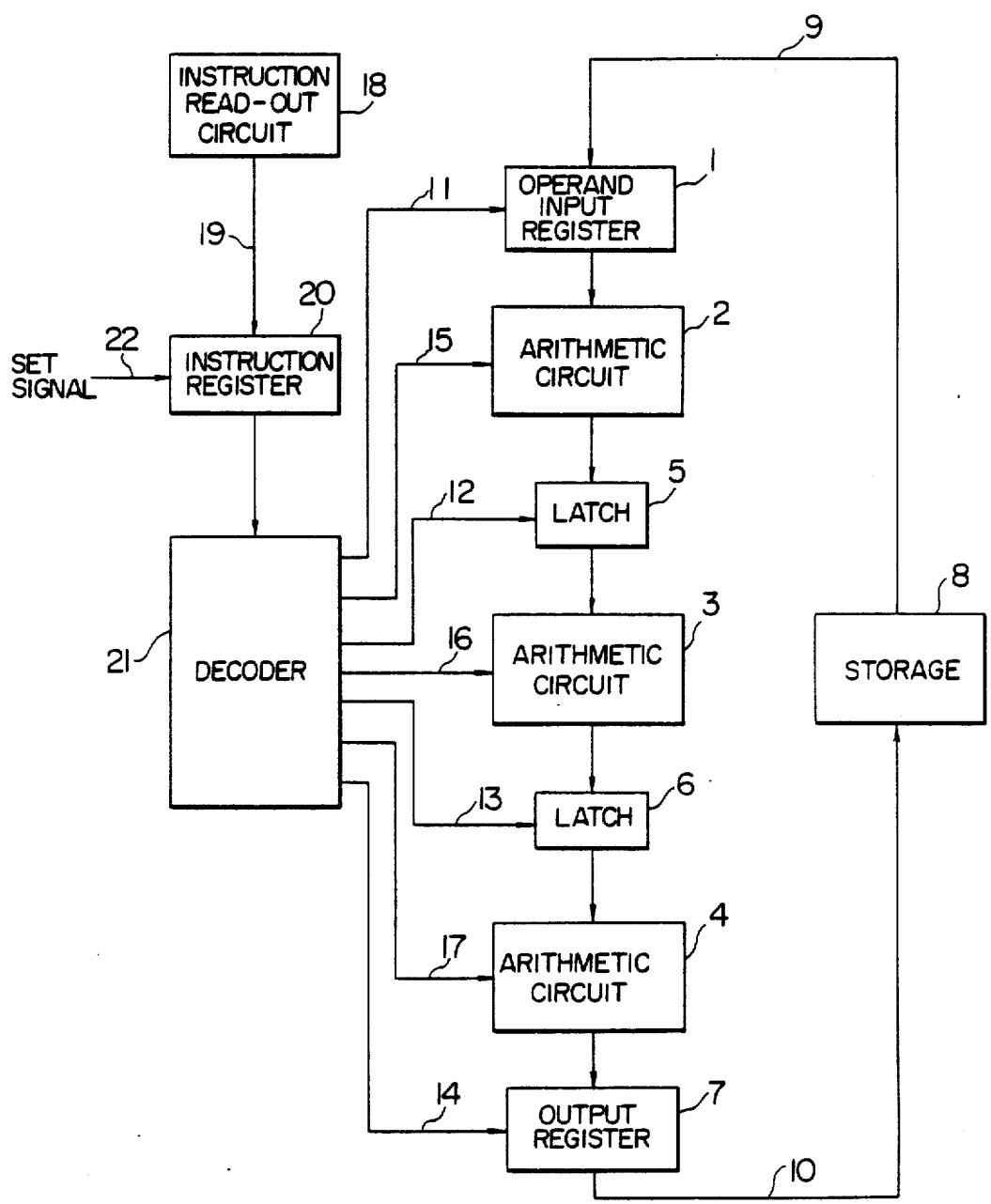
FIG. 1 is a block diagram showing a hitherto known pipeline arithmetic apparatus.
Figure 2:
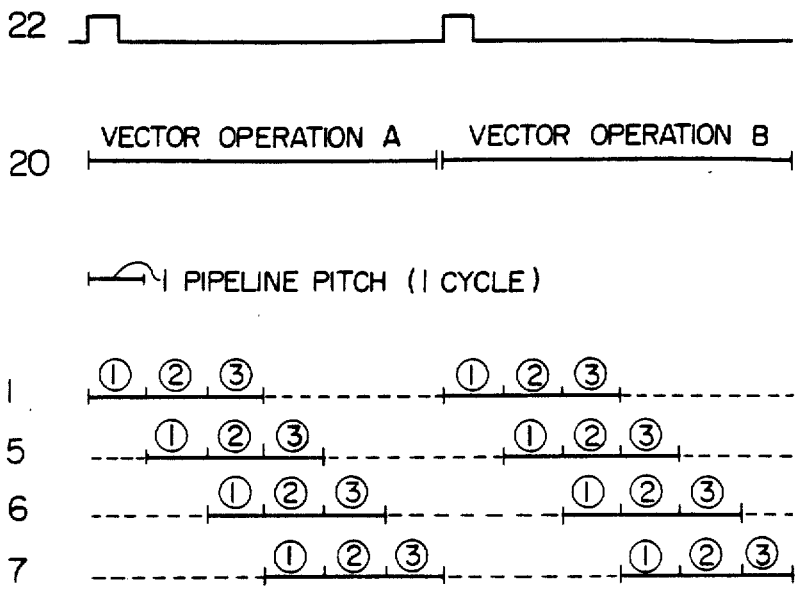
FIG. 2 shows time charts for ilustrating operations of the pipeline arithmetic apparatus shown in FIG. 1.
Figure 3:
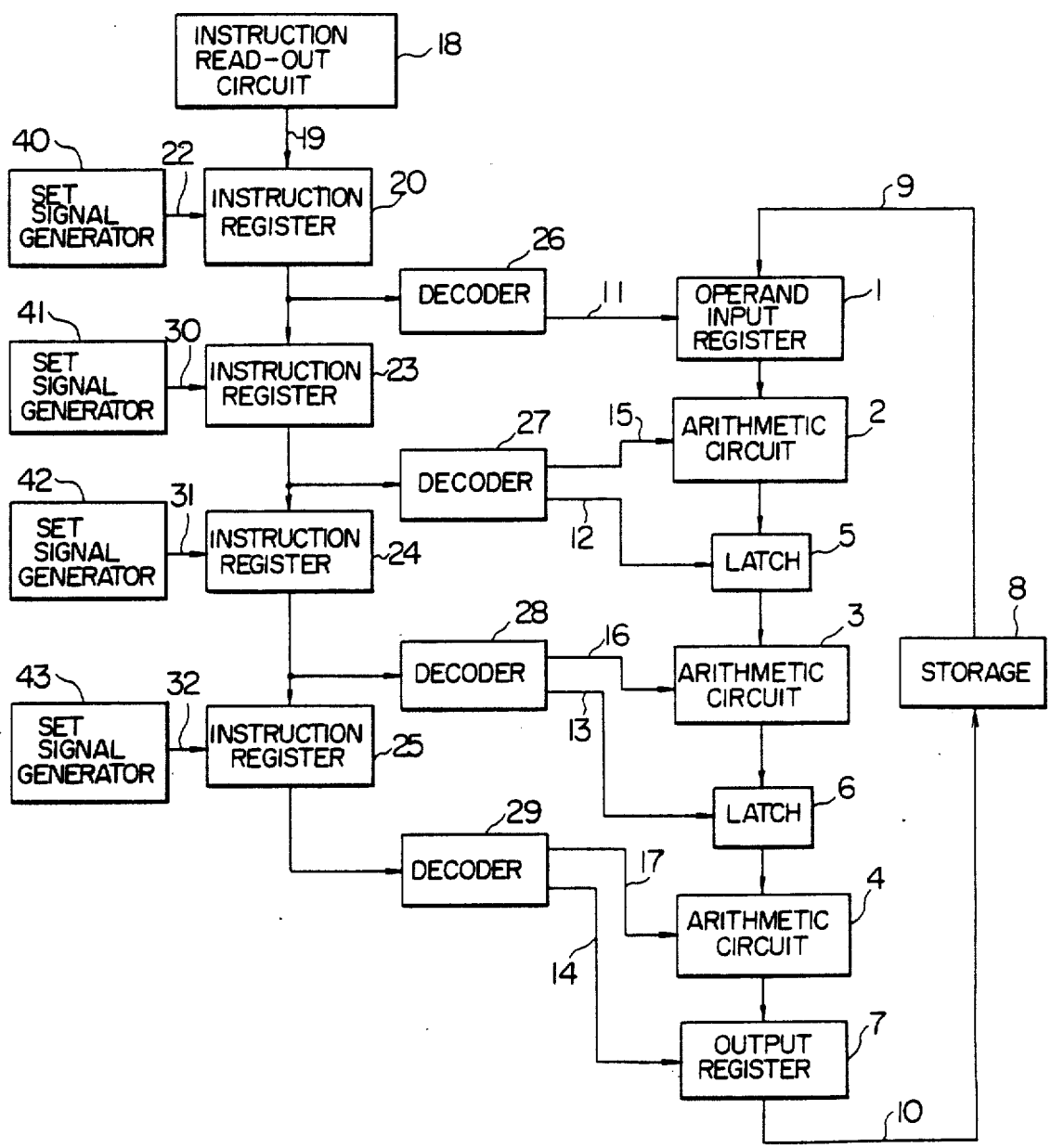
FIG. 3 shows in a block diagram a general arrangement of a pipeline arithmetic apparatus according to an embodiment of the present invention.

FIG. 3 shows in a block diagram a general arrangement of the pipeline arithmetic apparatus according to an embodiment of the invention. In the figure, the reference numerals 1 to 20 and 22 denote the same components as those shown in FIG. 1. Further description of these components will therefore be unnecessary. The pipleine arithmetic apparatus shown in FIG. 3 is also realized in three stages, wherein three aritmetic circuits 2, 3 and 4 are provided in association with instruction registers 23 to 25, which are set by set signals on lines identified by reference numerals 30, 31 and 32, respectively. Instruction decoders 26, 27, 28 and 29 are connected to the instruction registers 20, 23, 24 and 25, respectively, and serve for decoding the control information point arithmetic, the arithmetic circuit 2 executes a prenormalize operation, while the arithmetic circuit 3 executes the arithmetic operation (addition, subtraction or the like) of the mantissa and the arithmetic circuit 4 executes a post-normalize operation. On the other hand, when the control information indicates a fixed-point arithmetic operation, the arithmetic circuits 2 and 4 remains inoperative with only the arithmetic circuit 3 executing the designated operation. For other types of arithmetic operations, the arithmetic circuit 2 performs a shift operation.

The decoders 26 to 29 command the switching and the setting of the registers 1 and 7 and the latches 5 and 6. By way of example, the data input bus 9 may include buses for a first operand and a second operand, respectively. then, the decoder 26 may also command the setting of both operands or only one of the two operands. When the control information of the instruction register can be directly supplied to the registers and the latches to be utilized for the controls thereof without being decoded, the decoders 26 to 29 can of course be spared. In FIG. 3, reference numerals 40, 41, 42 and 43 denote circuits for generating the set signals 22, 30, 31 and 32 fed to the associated instruction registers. Generation of these set signals will be described below by referring to FIG. 4.

Figure 4:
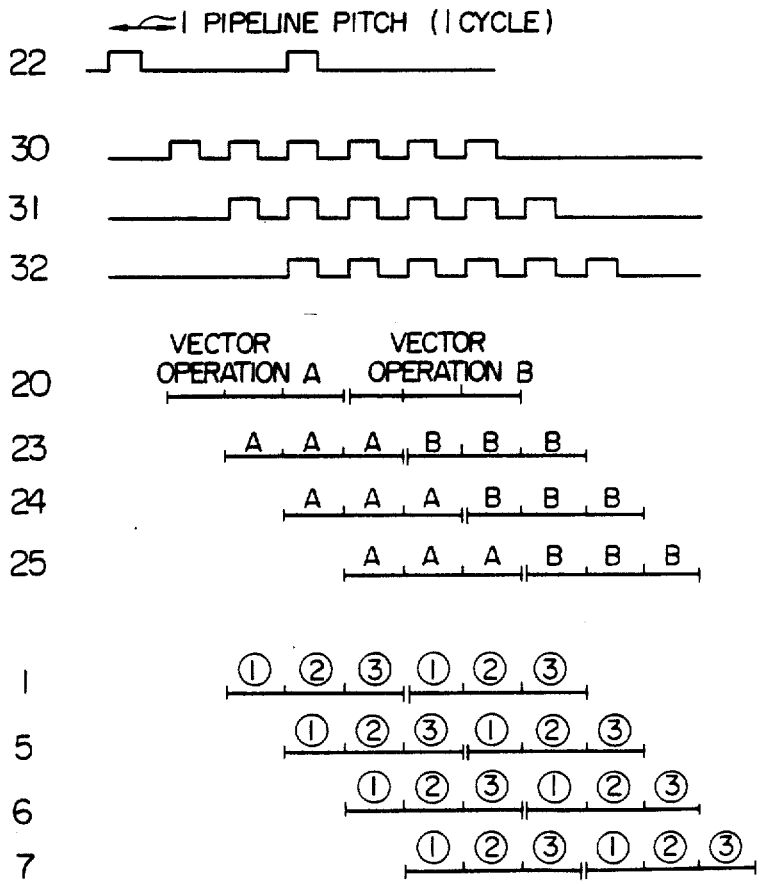
FIG. 4 shows time charts for illustrating operations for the apparatus shown in FIG. 3 taking place in executing vector operations.

FIG. 4 shows time charts for illustrating operations of the pipeline arithmetic apparatus shown in FIG. 3 on the assumption that two types of vector operations A and B are to be executed continuously and that each of the operations A and B is to be effected for three sets of input data, wherein ① to ③ denote the element number of the operand vectors.

The set signal 22 for the instruction register 20 is generated by the generator circuit 40 in a number of cycles equal to that of the elements. Since the number of the elements is assumed to be three in the case of the illustrated embodiment, the set signal 22 is generated at a time interval corresponding to three cycles. The element number is indicated by a vector length register (not shown). The generator circuit 40 produces the set signal to the instruction register 20 in accordance with the content of the vector length register. Thus, the instruction register 20 is updated every third cycle and holds the same control information for this period (three cycles). On the other hand, the set signals for the instruction registers 23, 24 and 25 associated with the stages, respectively, are generated every cycle by generator circuits 41, 42 and 43. Consequently, the control information of the instruction registers 23, 24 and 25, respectively, is updated every cycle with the information being concurrently transferred to the instruction registers associated with the succeeding stages, respectively. In this way, different control information can be held for all the stages to control the associated arithmetic circuits, respectively. Accordingly, simultaneously with the setting of the last set of input data for the vector operation A in the input operand register 1, the control information for the operation B can be set in the instruction register 20, which may be immediately followed by the cycle in which the first set of input data for the operation B can be set in the input operand register 1. In this manner, all the stages of the pipeline arithmetic apparatus can be effectively and efficiently utilized. It will be readily seen from FIG. 4 that two different types of arithmetic operations are simultaneously executed in an overlapping manner over three cycles.

In the case of the arrangement shown in FIG. 3, the instruction registers 23, 24 and 25 are provided in associated with the three stages in one-to-one correspondence. It will however be appreciated that when a single idle cycle is allowed to be inevitably involved upon changing-over between the arithmetic operations of the different types, a single register may be provided in association with the two adjacent stages in common to the two arithmetic circuits thereof.

In the pipeline arithmetic apparatus described above in conjunction with FIGS. 3 and 4, it has been assumed that the operand vectors can be freely read out from the storage 8, i.e. the read-out operation of the operand is initiated in synchronism with the activation of instruction, with the individual elements being successively read out.

However, there also exists such a case in which the operand vector is read out skipwise on the element base so that the individual elements are not always successively inputted to the pipeline arithmetic unit. For example, such a case may be mentioned in which although an operand vector is in the state ready to be supplied to the pipeline arithmetic unit, some of the elements are not yet supplied to the storage 8 from an apparatus (not shown). In that case, the contemplated control may still be made by producing from the storage 8 validity bits which indicate the validity of data on the data input bus 9. In the following, an exemplary embodiment of the pipeline arithmetic apparatus in which the individual elements of the operand vector are not always successively available will be described by taking as an example the case where the validity bit is outputted prior to the corresponding element by one cycle.

Figure 5:
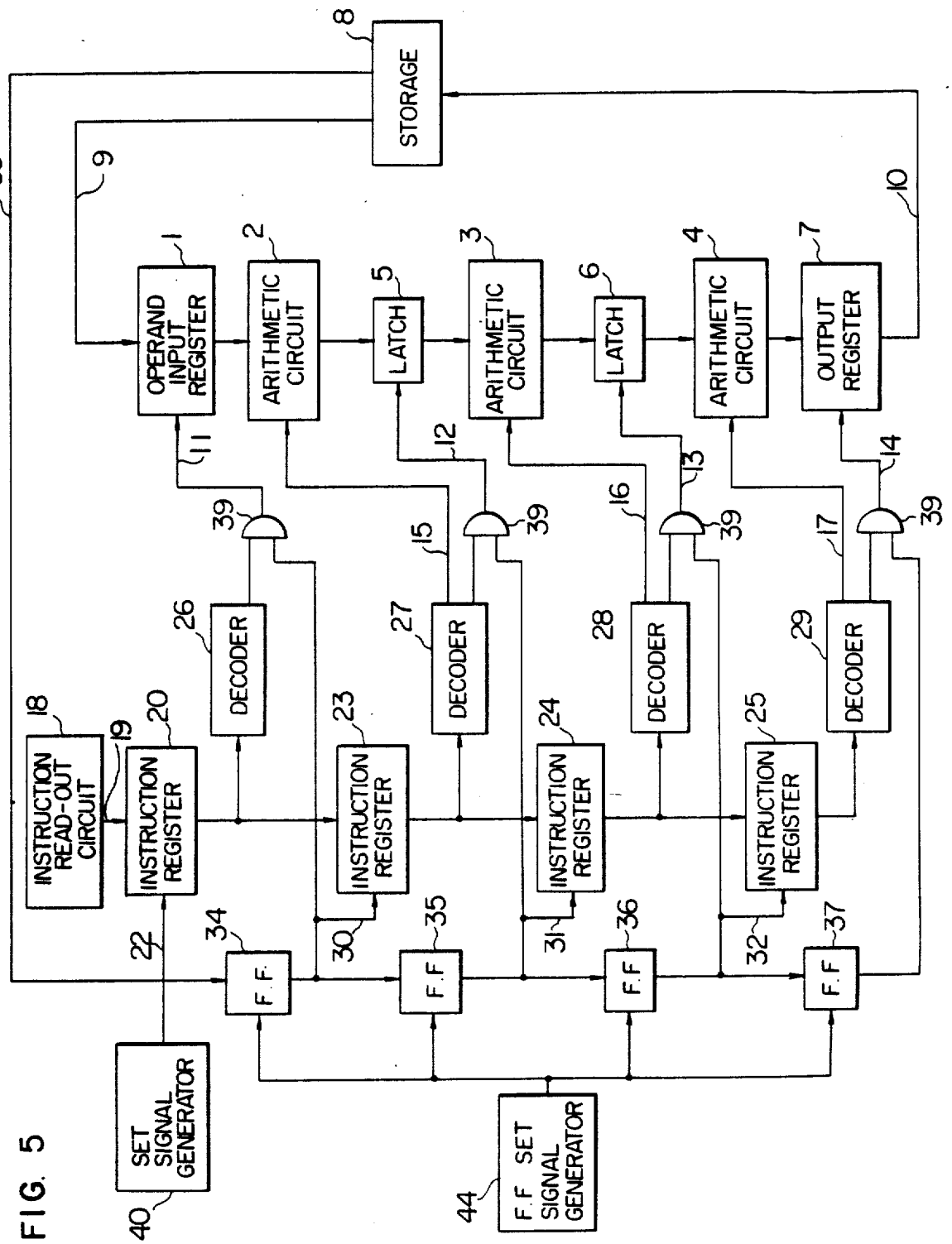
FIG. 5 is a block diagram showing a pipeline arithmetic apparatus according to another embodiment of the present invention.

Referring to FIG. 5, the validity bits 33 outputted from the storage 8 are successively fetched and shifted by flip-flops 34, 35, 36 and 37 activated every cycle in response to the set signal 38 produced by the generator circuit 44. The instruction registers 23, 24 and 25 associated with the respective stages are set by the output signals 30, 31 and 32 of the flip-flops 35, 36 and 37, respectively. Since the flip-flops are not set when the validity bit is logic "0", no set signals 30, 31, 32 are produced to the instruction registers 23, 24 and 25, resulting in no control information being set in the instruction registers 23, 24 and 25. The outputs of the flip-flops 34, 35, 36 and 37 are also coupled to the input terminals of AND gates 39, respectively, which thus block the set signals to the associated registers and the latches, when the inputs thereto are logic "0". Other circuit arrangement is similar to the one shown in FIG. 3.

Figure 6:
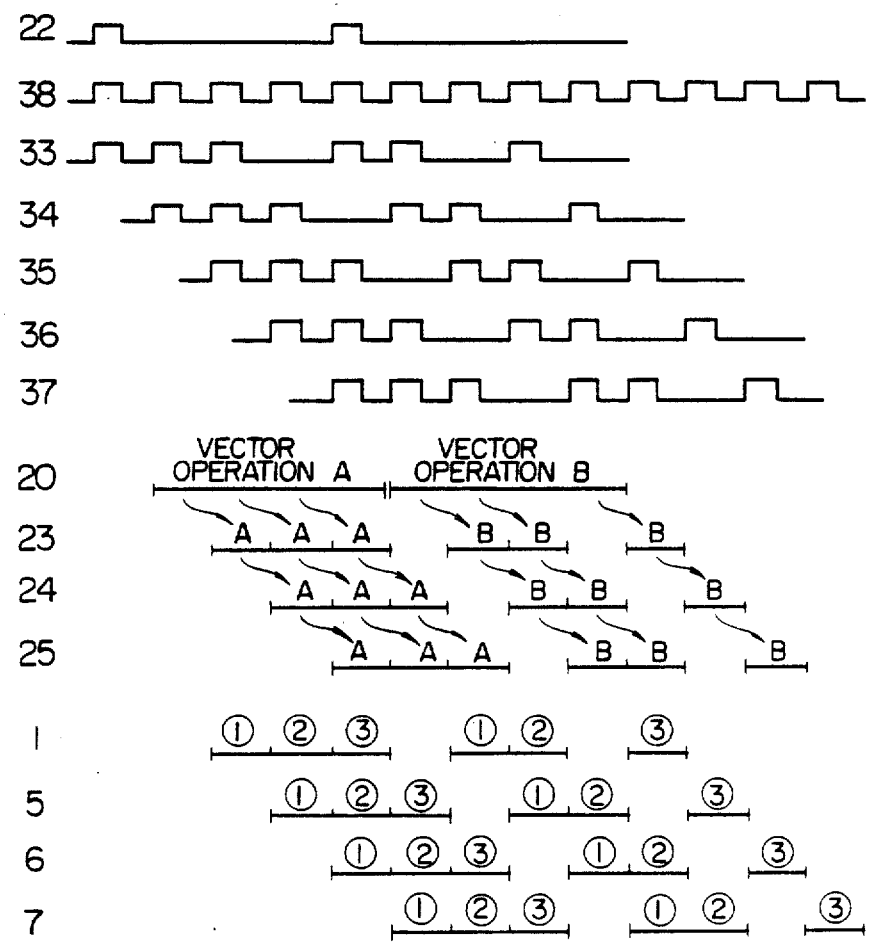
FIG. 6 shows time charts for illustrating operations of the apparatus shown in FIG. 5.

FIG. 6 shows time charts for illustrating operations of the pipeline arithmetic apparatus shown in FIG. 5. Referring to FIG. 6, the validity bit 33 is logic "0" at the fourth element of the arithmetic operation A and at the third element of the arithmetic operation B. Accordingly, no arithmetic operation is effected for these elements. In other respects, the same operations as those described hereinbefore with reference to FIGS. 3 and 4 are performed.

Figure 7:
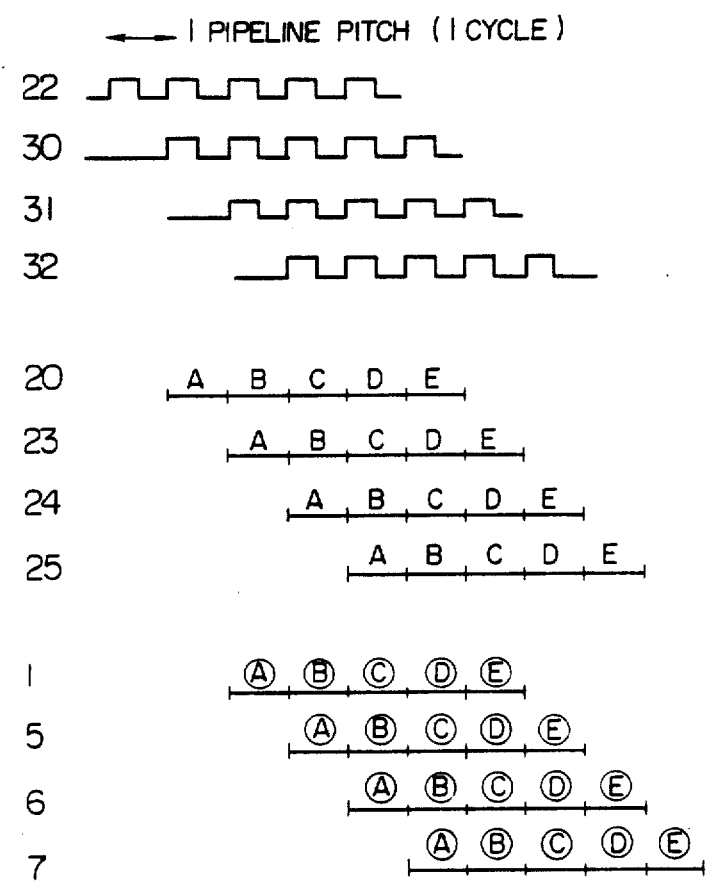
FIG. 7 shows time charts for illustrating operations of the pipeline arithmetic apparatus shown in FIG. 3 which is used in a general purpose computer.

The foregoing description has been made in conjunction with a vector arithmetic operation. It should however be mentioned that the pipeline arithmetic apparatus shown in FIG. 3 may be made use of in a general purpose computer. FIG. 7 shows time charts for illustrating operations of the pipeline arithmetic apparatus shown in FIG. 3 which is incorporated in a general purpose computer. As can be seen from FIG. 7, the set signals are produced every cycle by the generator circuits 40 to 43, whereby all the instruction registers 20, 23, 24 and 25 are correspondingly updated. It will further be seen from FIG. 7 that five types of arithmetic operations A to E are continuously processed in an overlapping manner.

It will now be appreciated that the invention has provided a pipeline arithmetic apparatus which the arithmetic circuits are provided in correspondence with the stages, while the register for holding the control information is provided in associated with each or a group of the arithmetic circuits, wherein the operations of the arithmetic circuits are commanded by the control information held by the associated registers, respectively, to thereby allow plural types of the arithemtic operations to be executed in an overlapping manner.

What is claimed is:

1. A pipeline arithmetic apparatus in which a vector operation, where operand vectors each comprising a plurality of elements are used as operands, is divided into a plurality of stages and processed in an overlapping manner in each of said stages, comprising:

means for retaining said operand vectors;

a plurality of arithmetic circuits provided, respectively, in association with said stages and connected in series to one another, and means for inputting the individual elements of said operand vectors from said retaining means to the arithmetic circuit of the leading one of said stages and for outputting the result of the arithmetic operation from the arithmetic circuit of the last stage to said retaining means, while the arithmetic circuits of the intermediate stages are respectively connected to receive the output from the arithmetic circuit of the preceding stage;

a first register for holding control information indicating the content of a type of arithmetic operation;

a plurality of second registers connected in cascade with said first register, each second register being provided in correspondence with at least a respective one of a plurality of said arithmetic circuits for holding control information indicating the type of arithmetic operation to be executed by the associated arithmetic circuit, the leading one of said second registers being connected to receive the control information from said first register;

command means for commanding the arithmetic operations by supplying to the associated arithmetic circuits the control information held by said second registers; and control means for controlling said first and second registers such that the control information in said first register is held for a number of cycles equal to the number of the elements of said operand vector and the control information of said second registers is updated every cycle in accordance with the contents of the second registers of the preceding stages, respectively.

2. A pipeline arithemtic circuit according to claim 1, further including a plurality of holding means, provided in association with said first and the second registers, respectively, and connected in series with one another to said retaining means, for holding validity bits each attached to each element of said operand vectors and received from said retaining means, wherein said control means includes means connected to said holding means for shifting the validity bits held by said holding means every cycle to the holding means of the succeeding stages, respectively, and for updating the control information held by the registers in accordance with the corresponding validity bits.

3. A pipeline arithmetic circuit according to claim 1, wherein said second registers and said command means are provided in associated with each of said arithmetic circuits.

4. A pipeline arithmetic circuit according to claim 2, wherein said second registers and said command means are provided in association with each of said arithmetic circuits.

5. A pipeline arithmetic circuit according to claim 3, wherein said command means includes means for controlling the inputting of the elements of said operand vector to each of said arithmetic circuits and/or the outputting of the results of arithmetic operation from each of said arithmetic circuits.

6. A pipeline arithmetic circuit according to claim 4, wherein said command means includes means for controlling the inputting of the elements of said operand vector to each of said arithmetic circuits and/or the outputting of the results of arithmetic operation from each of said arithmetic circuits.

7. A pipeline arithmetic circuit according to claim 6, wherein said holding means act on the outputs of said command means in accordance with said validity bits for controlling the inputting of the elements of the operand vector to each of said arithmetic circuits and/or the outputting of results of the arithmetic operations from each of said arithmetic circuits.

* * * * *